United States Patent
Entwistle

(10) Patent No.: US 6,968,566 B1
(45) Date of Patent: Nov. 22, 2005

(54) TELEVISION GUIDE SYSTEM

(75) Inventor: Paul Entwistle, Oxenhope (GB)

(73) Assignee: Pace Micro Technology Plc., Shipley (GB)

( * ) Notice: Subject to any disclaimer, the term of this patent is extended or adjusted under 35 U.S.C. 154(b) by 0 days.

(21) Appl. No.: 09/488,183

(22) Filed: Jan. 20, 2000

(30) Foreign Application Priority Data

Feb. 12, 1999 (GB) .................................... 9903220

(51) Int. Cl.⁷ ...................... H04N 5/445; H04N 11/00; H04N 5/91; G06F 3/00; G06F 13/00
(52) U.S. Cl. ............................ 725/39; 725/47; 725/50; 725/55; 725/58; 386/1; 386/83
(58) Field of Search .................... 725/39, 58, 131–134, 725/139–142, 151–153, 47, 50, 55; 386/1, 386/83

(56) References Cited

U.S. PATENT DOCUMENTS

| | | | | |
|---|---|---|---|---|
| 4,706,121 A | | 11/1987 | Young | .......................... 358/142 |
| 5,361,173 A | | 11/1994 | Ishii et al. | ...................... 360/27 |
| 5,686,954 A | | 11/1997 | Yoshinobu et al. | ............ 348/13 |
| 5,774,186 A | | 6/1998 | Brodsky et al. | ............. 348/553 |
| 5,826,168 A | | 10/1998 | Inoue et al. | ................... 455/6.2 |
| 6,324,338 B1 | * | 11/2001 | Wood et al. | ................... 386/83 |
| 2002/0054752 A1 | * | 5/2002 | Wood et al. | ................... 386/83 |
| 2003/0044165 A1 | * | 3/2003 | Wood et al. | ................... 386/83 |
| 2003/0154477 A1 | * | 8/2003 | Hassell et al. | ................. 725/39 |
| 2005/0047752 A1 | * | 3/2005 | Wood et al. | ................... 386/83 |

FOREIGN PATENT DOCUMENTS

| | | | | |
|---|---|---|---|---|
| EP | 0836320 A2 | 4/1998 | ............ | H04N 7/88 |
| EP | 0892554 A2 | 1/1999 | ............ | H04N 7/88 |

* cited by examiner

*Primary Examiner*—John Miller
*Assistant Examiner*—Michael W. Hoye
(74) *Attorney, Agent, or Firm*—Head, Johnson & Kachigian

(57) ABSTRACT

The invention relates to the generation of an Electronic Program Guide (EPG) from data transmitted to a receiver location. The EPG is generated from the data for display on a screen. The receiver of the data for the programs to be displayed and to which the EPG relates is capable of interrupting the display of the programs and saving the data in a memory for subsequent display at a later time. The present invention ensures that the EPG data is adjusted in accordance with the data held in the memory so as to continue to be synchronized with the programs which can be displayed.

7 Claims, 2 Drawing Sheets

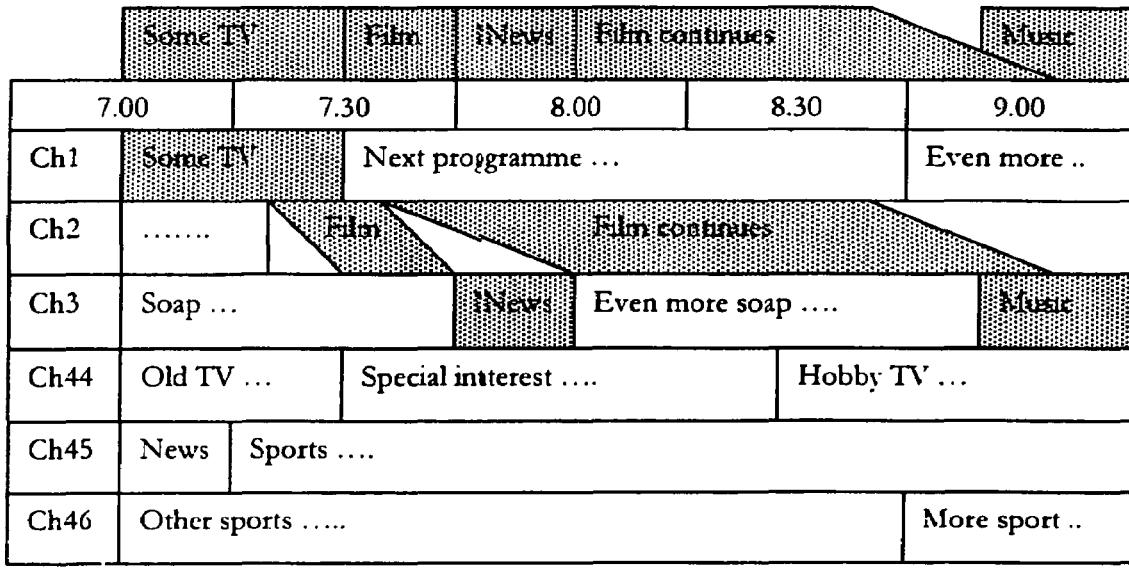

Figure 1

| 7.00 | 7.30 | 8.00 | 8.30 | 9.00 |
|---|---|---|---|---|
| Ch1 | Some TV | Next programme ... | | Even more .. |
| Ch2 | ....... | Film starts ..... | | ....... |
| Ch3 | Soap ... | News | Even more soap .... | Music |

Figure 2

| 7.00 | 7.30 | 8.00 | 8.30 | 9.00 |
|---|---|---|---|---|
| Ch1 | Some TV | Next programme ... | | Even more .. |
| Ch2 | ....... | Film starts | | ....... |
| Ch3 | Soap ... | News | Even more soap .... | Music |

Figure 3

| 7.00 | 7.30 | 8.00 | 8.30 | 9.00 |
|---|---|---|---|---|
| Ch1 | Some TV | Next programme ... | | Even more .. |
| Ch2 | ....... | Film | Film continues | |
| Ch3 | Soap ... | News | Even more soap .... | Music |

| | 7.00 | 7.30 | 8.00 | 8.30 | 9.00 |
|---|---|---|---|---|---|
| Ch1 | Some TV | Next programme ... | | | Even more .. |
| Ch2 | ....... | Film starts | | | ....... |
| hdd | ....... | Film starts | | | .... |
| Ch3 | Soap ... | | News | Even more soap .... | Music |

Figure 4

| | Some TV | Film | News | Film continues | | Music |
|---|---|---|---|---|---|---|
| | 7.00 | 7.30 | 8.00 | 8.30 | 9.00 | |
| Ch1 | Some TV | Next programme ... | | | Even more .. | |
| Ch2 | ....... | | Film | Film continues | | |
| Ch3 | Soap ... | | News | Even more soap .... | Music | |
| Ch44 | Old TV ... | Special interest .... | | Hobby TV ... | | |
| Ch45 | News | Sports .... | | | | |
| Ch46 | Other sports ..... | | | | More sport .. | |

Figure 5

TELEVISION GUIDE SYSTEM

CROSS-REFERENCE TO RELATED APPLICATIONS

This application claims priority to GB Application No. 9903220.3 filed 12 Feb. 1999.

BACKGROUND OF THE INVENTION

The invention to which this invention relates is to the generation and control of an electronic programme guide (EPG) of the type which is generated on a television display screen and transmitted and received from a remote broadcast location.

An EPG and data relating to the same is typically transmitted at regular intervals or continuously to allow the guide to be generated and displayed and/or updated as required. The EPG is an increasingly important requirement in television broadcasting systems as the number of channels which can be received increases. The EPG systems are frequently improved as the guide or the broadcast systems upon which the same are carried are improved and progressed and usually include a series of bars and columns in a grid format which includes a series of cells, each of the cells indicating a particular programme, typically including an indication of the title, and each of the cells is positioned with respect to a time indication and a channel indication so as to provide to the user and indication of where and when they can view various programmes.

One problem is the increased ability to control the display of programmes at the viewer location to suit the viewer's wishes. This means that if, for example, the viewer is watching a programme and wishes to interrupt the programme but not miss the remainder of the programme they can decide to store in the local memory of the apparatus the remainder of the programme, and then recommence viewing of the stored programme at the desired time. This feature may be of particular importance in the future and the problem with this is that the delaying of the transmission of the programme at a location means that the display of the programme at that location and subsequent programmes. are then out of synchronisation with the EPG data and information which is transmitted to that location. This can be confusing and/or irritating to the viewer.

SUMMARY OF THE INVENTION

The aim of the present invention is to provide a system whereby the localised delaying or altering of the viewing of a programme is taken into account in the generation of the electronic programme guide at that location or locations.

In a first aspect of the invention there is provided television data receiving apparatus which allows the display of a series of programmes at at least one location from data received, means for receiving data relating to and for generating an electronic programme guide at said location, which guide indicates the schedule of programmes and other information which can be displayed via the apparatus and means whereby the display of a programme or programmes can be delayed and or interrupted and data received for the remaining programme and/or subsequent programmes stored in a memory means for selective display at a later time and characterised in that the electronic programme guide at that location is adjusted in response to the delay in display of the remainder of the programme and/or subsequent programmes so as to provide synchronisation of the adjusted electronic programme guide details with the display of the remainder of the programme and/or subsequent programmes.

Thus, according to the invention, the schedule of the electronic programme guide is linked to the use of the local memory in the apparatus so as to automatically reflect scheduling adjustments caused by the time shifting of broadcast programmes by the user of the apparatus at a specific location rather than the broadcaster of the data. The inclusion of programme delay means and memory in set top boxes provides the ability to pause a broadcast programme and continue watching the same later to be possible and this has given rise to the problem of displaying the start and end times of the programme in an EPG accurately as the start and end times are adjusted in response to the local viewer operation of the storage device instead of the original transmission schedule.

By providing for the automatic and interactive modification and presentation of the EPG schedule at specific locations so as to represent the time shifting which may occur in the display of the remainder of a programme or subsequent programmes, so the EPG can be kept in synchronisation with the viewing schedule at that users location and display to the user the correct start and end times. This allows the user to organise their viewing knowing when time displaced broadcast programme and subsequent programmes will finish. Furthermore, they can schedule to watch, for example, a particular programme whilst pausing another which they were previously watching and then restarting the original programme and the EPG will adjust accordingly. The method of automatic temporal shifting within the EPG allows the selection to be made by locally processing and adjusting the broadcast schedule.

In one embodiment the electronic programme guide generating means receives a first signal to indicate the commencement of a delay in broadcast of programme data and commencement of storage of the same in the memory and a second signal to indicate when the viewing of the said data recommences and adjusts the electronic programme guide to take into account the time period between said first and second signals. Typically, the said signals or additional signals are received by the means for generating the electronic programme guide and indicate the particular programme and channel which has been selectively delayed by the user, so as to allow the EPG to be adjusted accordingly with respect to the appropriate channel and programme.

Typically the electronic programme guide is adjusted by generating an additional display feature which indicates the actual viewing schedule of the user, including any delays in viewing of programmes. In one embodiment the electronic programme guide is displayed as a grid with a number of rows, each indicating a channel and located with respect to a time band, and if a selected delay of a programme is made by the user an additional row is generated on the electronic programme guide to indicate the real time viewing schedule for the user at that apparatus location and including the delay.

In a further aspect of the invention there is provided television programme data receiving apparatus which allows the display of a series of programmes at at least one location from data received, means for receiving data relating to and for generating an electronic programme guide at said location, which guide indicates the schedule of programmes and other information which can be displayed via the apparatus and means whereby the display of a programme or programmes can be selectively delayed and or interrupted by the user of the apparatus at the location and data which is then received for the remaining programme and/or subsequent programmes which have been delayed stored in a memory means for selective display on the apparatus at a later time and characterised in that the electronic programme guide at that location is adjusted in response to the localised delay in display of the remainder of the programme and/or subsequent programmes so as to synchronise the adjusted electronic programme guide details to take into account the delay in display of programme material.

BRIEF DESCRIPTION OF THE DRAWINGS

Specific embodiments of the invention will now be described with reference to the accompanying diagrams wherein:—

FIG. 1 indicates a typical EPG schedule;

FIG. 2 indicates the schedule of FIG. 1 with highlighted viewing choices;

FIG. 3 illustrates the adjustments to the EPG made in one embodiment of the invention;

FIG. 4 illustrates an alternative embodiment of an EPG according to the invention; and FIG. 5 illustrates a yet further embodiment of the invention.

DETAILED DISCRIPTION OF THE PREFERRED EMBODIMENTS

It is possible for a user to record or store data onto a memory means such as a hard disc drive, (HDD), provided in or connected with data receiving apparatus at their premises. The data can relate to a particular programme or programmes on a particular channel or the like whilst it is being viewed. This allows the viewer to pause and then recommence watching that channel by locally storing the broadcast channel data which is received during the pause or delay in viewing. When the user selects to continue viewing the programme is generated from the data which is stored in the HDD and recommences at the point in the programme where the pause occurred and is then viewed by the viewer. The writing of programme material which has been transmitted and received in that time is contained and stored in a time buffer. The buffer therefore represents time shifted programme material such as an entire broadcast channel or potentially multiplex channels and in accordance with the invention the EPG which is generated reflects the fact that the programme material associated with a channel needs to be locally offset by the time buffer so that the EPG reflects the schedule for that particular user which has been changed due to the selection of the delay function and therefore differs from the EPG schedule which would be generated from the data transmitted to all user locations by the broadcaster.

In accordance with the invention the EPG generation means can identify the time delay from data signal received from the memory means and can also identify the location in terms of channel and programme of the data which has been stored during the delay. One possibility is to represent this by "slipping" the row of the EPG display which relates to the channel which has been delayed and the extent of this "slippage" is determined by the buffer quantity i.e. the length of the delay. A further enhancement can be to display the original channel row timings as that is still accessible to be viewed immediately by the viewer and the data for this is still received from the broadcaster, and generate an additional channel which reflects the contents of the HDD or memory means so as to illustrate to the viewer the extent of delay and allow the viewer to select which source to watch. A yet further embodiment is to represent the duration of programmes as rectangular areas and to illustrate displacement through use of the delay facility by diagonal lines which highlight the skew between the broadcast and the stored schedules at the particular location. A yet further embodiment is to only show the time displacement of an individual programme on that channel rather than the whole channel so that for example if a film is paused to watch the news, the EPG displays the skewed end time of the film only and allows further viewing planning to be undertaken.

FIG. 1 illustrates one example and illustrates a typical EPG schedule for 3 channels, namely Ch1, Ch2 and Ch3 and shows the schedule of programmes from 7 o'clock to 9 o'clock. Normally, the user or viewer of the EPG will highlight the viewing choices, as shown in FIG. 2, so that, for example, between 7 and 7.30 they are watching channel 1, then between 7.30 and 8.30 channel 2 and wish to watch the news at 8.00 and music at 9.00 on channel 3. It will be seen however that these selections overlap but by using the storage system of the apparatus the film on channel 2 can be interrupted and delayed by the user so that the news on channel 3 can be watched at the appropriate time as shown in FIG. 3. The viewing of the film is continued with the display generated from the data held on the memory means at the data receiver at the user location so that the end of the film can be watched. However due to the delay the users viewing schedule is then out of synchronisation with the schedule of FIG. 2, so that the film in fact ends at 9 o'clock in reality as shown in FIG. 3 as opposed to 8.30 shown in FIG. 2. Thus, with FIG. 3, the EPG schedule is locally reprocessed to reflect the new viewing times, i.e. the film is delayed from starting until the selection on channel 1 is complete and thus the start of the film is stored in the local memory. When the film is started from the memory then the viewing of that is interrupted by the insertion of the news from Channel 3 which is shown live and the remainder of the film is paused until the news has finished and viewing then recommences.

An alternative method of displaying the process schedule data is shown in FIG. 4 which shows a "slipped" channel representation which represents the data which is being stored on the HDD memory. Thus, it is shown that in Channel 1 the term "Some TV" is being watched and a film has started on Channel 2 while Channel 1 was being watched but the new line "HDD" indicates when the actual film started as it was previously being stored in the HDD memory means and so represents to the viewer the change in schedule.

A yet further alternative arrangement is shown in FIG. 5 wherein a static selected viewing channel can be displayed that always remains visible even when the channels are scrolled down so that in FIG. 5 it is shown that the top line indicates the highlighted viewing which is "some TV" followed by "film" followed by "news" followed by "film" and then music while the remainder of the schedule indicates to the viewer what changes have occurred in the EPG schedule as a result of the viewing which has taken place.

While the invention has been described with a certain degree of particularly, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A television data receiving apparatus which allows the display of a series of programs at at least one location from data received, said apparatus comprising:

means for receiving data relating to and for generating an electronic program guide at said at least one location, which guide indicates a schedule of programs including broadcast programs, and other information which can be displayed via the apparatus; and means whereby the display of a broadcast program or programs can be delayed and or interrupted and data received for a remaining broadcast program and/or subsequent broadcast programs stored as a stored program or programs in a memory means for selective display at a later time and wherein when a plurality of said stored and/or broadcast programs, including at least one location representing a broadcast program are selected for display and display of the same would overlap in time, the electronic program guide at the selected locations is time shifted in response to the delay in display of the remainder of a broadcast program and/or subsequent broadcast programs so as to provide synchronization of the time shifted electronic program guide details with said display of the stored program or programs and/or said display of the remainder a broadcast program and/or subsequent broadcast programs and thereby prevent said overlap.

2. A television data receiving apparatus according to claim 1 wherein the schedule generated for said electronic program guide is linked to the use of a local memory at said at least one location and display so as to automatically reflect scheduling adjustments caused by the time shifting of broadcast programs by the user selecting to delay the display of a program.

3. A television data receiving apparatus according to claim 1 wherein the electronic program guide generating means receives a first signal to indicate that commencement of a delay in broadcast of program data and commencement of storage of the same in said memory means and a second signal to indicate when the viewing of the data recommences and adjusts the electronic program guide to take into account the time period between said first and second signals.

4. A television data receiving apparatus according to claim 3 wherein said first and/or second signals and/or additional signals are received by said means for generating said electronic program guide and indicate the particular broadcast program and channel which have been selectively delayed by the user.

5. A television data receiving apparatus according to claim 1 wherein said electronic program guide is adjusted by generating an additional display feature which indicates the actual viewing schedule of the user, including any delays in viewing of the programs.

6. A television data receiving apparatus according to claim 5 wherein said electronic program guide is displayed as a grid with a number of rows, each indicating a channel and located with respect to a time band, and if a selected delay of a broadcast program is made by the user an additional row is generated on said electronic program guide to indicate the real time viewing schedule for the user at that apparatus location and including the delay.

7. A television program data receiving apparatus which allows the display of a series of programs at at least one location from data received, said apparatus comprising:

means for receiving data relating to and for generating an electronic program guide at said at least one location, which guide indicates a schedule of one or more broadcast programs and other information which can be displayed via the apparatus; and means whereby the display of a broadcast program or programs can be selectively delayed and or interrupted by a user of the apparatus at a location and data which is then received for a remaining broadcast program and/or subsequent broadcast programs which have been delayed stored in a memory means as stored programs for selective display on the apparatus at a later time and wherein locations representing two or more broadcast and/or stored programs are selected including at least one broadcast program location, and the electronic program guide at the locations selected is time shifted where the locations overlap in time in response to a localized delay in display of the remainder of a broadcast program and/or subsequent broadcast programs so as to avoid overlap of the display of broadcast and/or stored programs.

* * * * *